(12) United States Patent
Takamura et al.

(10) Patent No.: US 10,240,311 B2
(45) Date of Patent: *Mar. 26, 2019

(54) CONTRACTION AND CONFINEMENT OF OIL SLICKS ON WATER, INCLUDING WATER WHERE ICE IS PRESENT, USING NON-IONIC SURFACTANTS

(71) Applicant: UNIVERSITY OF WYOMING, Laramie, WY (US)

(72) Inventors: Koichi Takamura, Penn Valley, CA (US); Norman R. Morrow, Laramie, WY (US); Nina Loahardjo, Spicewood, TX (US); Winoto, Spicewood, TX (US)

(73) Assignee: University of Wyoming, Laramie, WY (US)

( * ) Notice: Subject to any disclaimer, the term of this patent is extended or adjusted under 35 U.S.C. 154(b) by 570 days.

This patent is subject to a terminal disclaimer.

(21) Appl. No.: 14/701,493

(22) Filed: Apr. 30, 2015

(65) Prior Publication Data

US 2016/0017560 A1     Jan. 21, 2016

Related U.S. Application Data

(60) Provisional application No. 61/986,597, filed on Apr. 30, 2014.

(51) Int. Cl.
    *E02B 15/08*     (2006.01)
    *E02B 15/04*     (2006.01)
    (Continued)

(52) U.S. Cl.
    CPC ............... *E02B 15/08* (2013.01); *C02F 1/40* (2013.01); *C02F 1/681* (2013.01); *E02B 15/04* (2013.01);
    (Continued)

(58) Field of Classification Search
None
See application file for complete search history.

(56) References Cited

U.S. PATENT DOCUMENTS 2,447,551 A    8/1948   Zisman
3,676,359 A    7/1972   Garrett
(Continued)

OTHER PUBLICATIONS

Santa Cruz Biotechnology (Product information for ethyleneglycol monodecyl ether, pp. 1-3, accessed online Oct. 5, 2017). (Year: 2017).*

(Continued)

*Primary Examiner* — Clare M Perrin
(74) *Attorney, Agent, or Firm* — Samuel M. Freund; Cochran Freund & Young LLC

(57) ABSTRACT

Methods for reducing the size of an oil slick on a water surface or on a water surface when ice is present are described. Spreading of oil can be reversed by reducing the surface tension of the seawater, for example, by using a low concentration of at least one water-soluble surfactant, such as a non-ionic surfactant. A controlled amount of the surfactant or surfactant mixture may be discharged over time at the inner-wall of a spill control boom surrounding the oil spill, or within the vicinity of the oil spill in the absence of control booms using a soaker hose or a floating polyethylene or polypropylene hose impregnated with surfactant, whereby the confinement and contraction of the oil slick is maintained by compensating for dissolved surfactant and surfactant moving away from the oil slick. Water-soluble surfactants are typically solids or gels at low temperatures when no organic co-solvent is added to the surfactant. The solid or gel form is advantageous for generating slow, but continuous release of surfactant, and thus there is no need for an organic co-solvent. This is not the situation for oil-soluble surfactants, which require an organic co-solvent (Continued)

to be successfully applied at low temperatures. Mixing oil-soluble surfactants with water-soluble surfactants may overcome the problem of dispersing oil-soluble surfactant without an organic co-solvent at low temperatures.

27 Claims, 7 Drawing Sheets

(51) Int. Cl.
    *C02F 1/68*     (2006.01)
    *C02F 1/40*     (2006.01)
    *B01D 17/04*     (2006.01)
    *C02F 101/32*     (2006.01)
    *C09K 8/524*     (2006.01)
    *C02F 103/08*     (2006.01)

(52) U.S. Cl.
    CPC .......... *E02B 15/041* (2013.01); *E02B 15/045* (2013.01); *B01D 17/047* (2013.01); *C02F 2101/32* (2013.01); *C02F 2103/08* (2013.01); *C02F 2305/04* (2013.01); *C09K 8/524* (2013.01); *Y02A 20/204* (2018.01)

(56) References Cited

U.S. PATENT DOCUMENTS

| | | | | |
|---|---|---|---|---|
| 3,810,835 | A | * | 5/1974 | Ferm ................ B01J 20/22 210/749 |
| 3,959,134 | A | | 5/1976 | Canevari |
| 4,160,033 | A | | 7/1979 | Garrett |
| 4,190,531 | A | | 2/1980 | Falk |
| 4,197,197 | A | | 4/1980 | Abaeva |
| 4,224,152 | A | | 9/1980 | Lepain |
| 4,293,348 | A | | 10/1981 | Shewmaker |
| 4,502,975 | A | | 3/1985 | Kobayashi |
| 5,406,019 | A | * | 4/1995 | Dean ................ B09C 1/02 405/128.25 |

OTHER PUBLICATIONS

Sigma (Product information for Poly(ethylene glycol) monolaurate, pp. 1-3, accessed online Oct. 5, 2017) (Year: 2017).*
HLB Values, accessed online on Jul. 20, 2018, pp. 1-2.*
Summary by Merv Fingas, Review of Oil Spill Herders, 2013, 4 total pages.
Zisman, William A.: "The Spreading of Oils on Water Part III. Spreading Pressures and Gibbs Adsorption Relation," J. Chem. Phys., Nov. 1941, vol. 9 (No. 11) 789-793.
William D. Garrett (1969) Confinement and Control of Oil Pollution on Water with Monomolecular Surface Films. International Oil Spill Conference Proceedings: Dec. 1969, vol. 1969, No. 1 pp. 257-261.
Garrett, W.D. and W.R. Barger, 1970. Factors affecting the use of monomolecular surface films to control oil pollution on water. Environmental Science and Technology, vol. 4, No. 2 pp. 123-127.
William R. Barger (1973) Laboratory and Field Testing of Surface-Film Forming Chemicals for Use as Oil Collecting Agents. International Oil Spill Conference Proceedings: Mar. 1973, vol. 1973 No. 1. pp. 241-246.
Pamela Pope, Al Allen, and William G. Nelson (1985) Assessment of Three Surface collecting Agents during Temperate and Arctic Conditions. International Oil Spill Conference Proceedings: Feb. 1985, vol. 1985, No. 1 pp. 199-201. MSRC, 1995.
Ian Buist, Dr. Tim Nedwed, and Joe Mullin (2008) Herding Agents Thicken Oil spills in Drift Ice to Facilitate In-Situ Burning: A New Trick for an Old Dog. International Oil Spill Conference Proceedings: May 2008, vol. 2008, No. 1 pp. 673-679.
Ian Buist, Stephen Potter, and Dr. Tim Nedwed (2011) Herding Agents to Thicken Oil Spills in Drift Ice for In-Situ Burning: New Developments. International Oil Spill Conference Proceedings: Mar. 2011, No. 1, pp. abs 230.
Ian Buist and Dr. Tim Nedwed (2011) Using Herders for Rapid In-Situ Burning of Oil Spills on Open Water. International Oil Spill Conference Proceedings: Mar. 2011.
Ian Buist, Dr. Time Nedwed, Dr. Amy Tidwell, Peter Lane, Peter Newsom, and Ken Flagg (2014) Update on Developing and Commercializing Oil Herders for In-Situ Burning. International Oil Spill Conference Proceedings: May 2014.
Oil Spreading Control, LLC, ICR, power point presentation, Aug. 2014, 36 total pages.
Water Displacing Fluids and Their Application to Reconditioning and Protecting Equipment, Naval Research Lab, Oct. 1948, 52 total pages.
Field Testing of the USN Oil Herding Agent on Heidrun Crude in Loose Drift Ice, SNITEF Materials and Chemistry, Ian Buist, S.L. Environmental Research Ltd., Ottawa, Canada, Mar. 2010, 53 total pages.
15SL Literature Review of Chem Oil Spill Dispersants and Herders in Fresh and Brackish Waters, Ross Environmental Research, Ottawa, Ontario, Jan. 2010, 66 total pages.
Update on Developing and Commercializing Oil Herders for In-Situ Burning, SL Ross Environment Research, Ian Buist, et al, 2014, 16 total pages.

* cited by examiner

CONTRACTION AND CONFINEMENT OF OIL SLICKS ON WATER, INCLUDING WATER WHERE ICE IS PRESENT, USING NON-IONIC SURFACTANTS

CROSS-REFERENCE TO RELATED APPLICATIONS

The present application claims the benefit of U.S. Provisional Patent Application No. 61/986,597 for "Herding Oil Slicks Using Non-Ionic Surfactants On Water Including Ice-Infested Water" by Koichi Takamura et al., which was filed on Apr. 30, 2014, the entire content of which is hereby specifically incorporated by reference herein for all that it discloses and teaches.

FIELD OF THE INVENTION

The present invention relates generally to confining oil slicks and, more particularly, to the use of at least one water-soluble non-ionic surfactant or mixtures of at least one oil-soluble surfactant and at least one water-soluble non-ionic surfactant, for reducing the size of an oil slick for more effective oil removal or in-situ burning on seawater, including seawater where ice is present.

BACKGROUND OF THE INVENTION

Oil spills due to releases of crude oil from tankers, offshore platforms, drilling rigs, and wells, as well as spills of refined petroleum (such as gasoline or diesel) and their by-products, and heavier fuels used by large ships such as bunker fuel, if uncontrolled may have devastating and lasting environmental impact. Such spills may be controlled by chemical dispersion, combustion, mechanical containment, and/or adsorption. Controlled burning can reduce the amount of oil in water, but can only be done in low wind conditions. Dispersants create smaller oil droplets which may be scattered by currents, and may degrade more easily. Dry hydrophobic, water insoluble polymers that both adsorb and absorb hydrocarbons can clean up oil spills by changing the physical state of oil from liquid to a semi-solid or a rubber-like material that floats on water, rendering it readily collectable. However, collected solidifiers must be disposed of in landfills, recycled as an additive in asphalt or rubber products, or burned as a low ash fuel. Oil-absorbing materials such as hair and fabrics may also be used. Oil may be "vacuumed" from the surface, along with some water, and the mixture centrifuged to separate the oil from the water, thereby permitting nearly pure oil to be collected, the water often being returned to the sea. Oil skimming devices may also be used.

Typically, large floating barriers, known as booms, are used to surround and confine an oil slick, thereby enabling chemical and biological agents to be added to the oil to encourage its breakdown, and mechanical techniques to be used more efficiently.

The ever-growing importance of Arctic waters as sources of oil and natural gas generates additional challenges for spill responses. As stated above, examples of responses for mitigating adverse effects of oil spills include the use of dispersants, in-situ burning, and mechanical recovery, with mechanical containment and recovery being the most preferable. However, use of conventional booms and skimmers for mitigation of oil spills is challenging in seawater where ice is present.

Surfactants presently used for contracting oil slicks include mixtures of Span®, a water insoluble surfactant, and 2-ethyl butanol, an organic co-solvent. The U.S. Navy formulations for such uses include: (a) 75% Span® 80 and 25% of an organic co-solvent for warm water applications; (b) 65% Span® 20 and 35% of an organic co-solvent for cold water applications; and (c) 35% Span® 20 and 65% of an organic co-solvent for "winter" blend applications. The organic co-solvent is important when liquid forms of surfactant or surfactant mixtures are desirable. Thickslick 6535 has recently been offered by a contractor of ExxonMobil for contracting oil slicks for subsequent in situ burning. The 2-ethyl butanol co-solvent is toxic and biological degradation is very slow.

Proposed surfactant materials and formulations include mixtures of non-ionic surfactants and anionic surfactants, for example Corexit 9527, fluorine-based surfactants, and silicone-based surfactants, such as Siltech OP-40.

SUMMARY OF THE INVENTION

Embodiments of the present invention overcome the disadvantages and limitations of the prior art by providing a method for reducing the size of an oil spill on a water surface.

Another object of embodiments of the present invention is to provide a method for reducing the size of an oil spill on a water surface in the presence of ice.

Still another object of embodiments of the present invention is to provide a method for reducing the size of an oil spill on a water surface in the presence of ice without using nonaqueous solvents.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the method for reducing the size of an oil slick, having a spreading coefficient, S, and an area, on a water surface, hereof includes: deploying a floating oil control boom having a chosen length extending around at least a portion of the area of the slick in the vicinity of the oil slick, and a surface facing the oil slick; and dispersing a chosen mixture of at least one water-soluble surfactant and at least one oil-soluble surfactant in the absence of an organic solvent for the at least one oil-soluble surfactant between the floating oil boom and the oil slick in an amount effective for maintaining the spreading coefficient at a value less than zero.

In another aspect of the present invention and in accordance with its objects and purposes, the method for reducing the size of an oil slick, having a spreading coefficient, S, and an area, on a water surface, hereof includes: dispersing at least one water-soluble surfactant, or a chosen mixture of at least one water-soluble surfactant and at least one oil-soluble surfactant in the absence of an organic solvent for the at least one oil-soluble surfactant at least at one location in the vicinity of the oil slick in an amount effective for maintaining the spreading coefficient at a value less than zero in the absence of a floating oil control boom.

In yet another aspect of the present invention and in accordance with its objects and purposes, the method for reducing the size of an oil slick, having a spreading coefficient, S, and an area, on a water surface, hereof includes: deploying a floating rope having a chosen length extending around at least a portion of the area of the slick in the vicinity of the oil slick impregnated with at least one water-soluble surfactant or a chosen mixture of at least one water-soluble surfactant and at least one oil-soluble surfactant in the absence of an organic solvent for the at least one oil-soluble surfactant for releasing the at least one water-soluble surfactant or the chosen mixture of at least one water-soluble surfactant and at least one oil-soluble surfactant in an amount effective for maintaining the spreading coefficient at a value less than zero.

Benefits and advantages of embodiments of the present invention include, but are not limited to, providing a method for reducing the size of an oil slick on the surface of water or on the surface of water in the presence of ice using surfactants having low toxicity, and in the absence of added organic co-solvents, such that mechanical recovery or in-situ burning thereof is rendered more effective.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3A shows about 10 mL of oil poured in a spiral pattern on the surface of 0° C. water to which crushed ice has been added; FIG. 3B shows the spreading of the oil after about one min.; FIG. 3C shows the oil retraction 5 s after frozen water-soluble non-ionic surfactant (BIO-SOFT®) was added (white dot at 11 o'clock near the wall of the pool); FIG. 3D shows the oil having gathered in clumps on the sides of the crushed ice, 30 s after addition of the surfactant, effective retraction having been hindered by the presence of the ice; and FIG. 3E shows the oil having formed thicker clumps, principally surrounding the ice, 120 s after adding the water-soluble non-ionic surfactant.

DETAILED DESCRIPTION OF THE INVENTION

Figure 1:
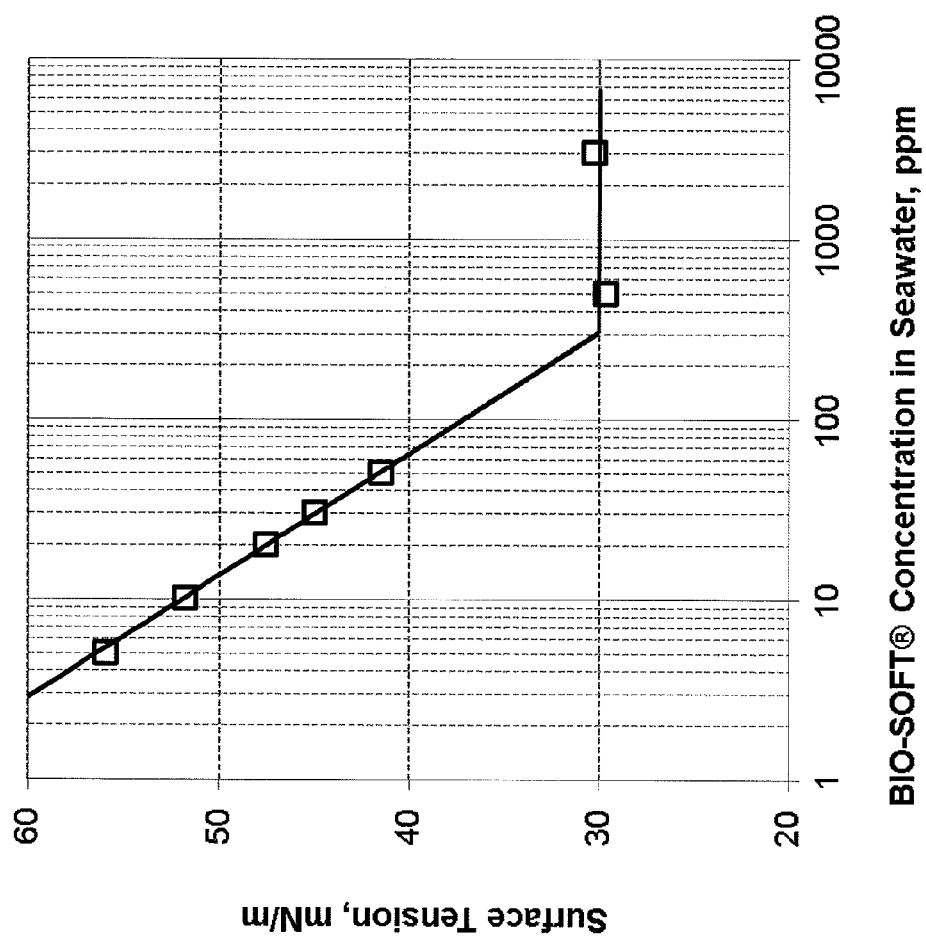
FIG. 1 is a graph of the surface tension of seawater as a function of the concentration of BIO-SOFT®, a water-soluble non-ionic surfactant added to the seawater.

Crude oil spreads rapidly when spilled on the surface of an open body of water forming a thin layer, making mechanical recovery of the dispersed oil inefficient. However, if oil spill control booms are utilized to confine the spilled crude oil, the oil may form masses having increased thickness over that for the unconfined oil, and often can be efficiently mechanically removed. In accordance with the teachings of embodiments of the present invention, if a small amount of water-soluble surfactant, such as BIO-SOFT® or Tween®, or a small amount of a water-soluble and oil-soluble surfactant mixture, such as Tween® and Span®, is continuously discharged adjacent to the wall of a deployed boom facing the oil slick (the inner wall of the boom), the oil slick will contract toward the center of the area enclosed by the boom. Such contraction further decreases the area of the oil slick and increases its thickness, thereby facilitating mechanical recovery thereof.

Further, mixtures of oil-soluble surfactants, such as Span®, fluorine-based or silicon-based surfactants, and organic co-solvents, such as 2-ethyl butanol, may be utilized to confine the spilled crude oil to a limited area without a need for an oil control boom, whereby the oil is compressed into lenses having increased thickness, which can be more efficiently mechanically removed or burned in-situ. In the absence of the organic co-solvent however, the surfactant molecules cannot diffuse into or onto the body of water, or do so very slowly, rendering the surfactant inefficient as water surface tension reduction agent. Moreover, some of the useful co-solvents tend to be flammable, which makes handling, storage and application hazardous.

In accordance with the teachings of embodiments of the present invention, oil-soluble surfactants can be utilized without an organic co-solvent for reducing the water surface tension for oil retraction away from the surfactant-dispensing location, if a water-soluble surfactant, such as BIO-SOFT® or Tween®, is mixed with the oil-soluble surfactant such that the mixture has greater water solubility than oil solubility. The oil-soluble surfactants can then diffuse into or on the body of water without the need for an organic co-solvent and, when the water-soluble surfactant or the mixture of a water-soluble surfactant and an oil-soluble surfactant is continuously discharged surrounding oil slick, the oil slick is expected to contract towards the center of the area enclosed by the surfactant mixture deployment locations. Such contraction decreases the area of the oil slick and increases its thickness, thereby facilitating mechanical recovery or in-situ burning thereof. Additionally, the replacement of the organic co-solvent with water as a co-solvent has the advantage that water is readily available anywhere there is an oil slick on water.

The requirement for a low-viscosity liquid for oil-soluble surfactants to be effective for contracting and confining oil slicks, such as the mixture of Span® and an organic co-solvent, such as 2-ethyl butanol, is removed for water-soluble surfactants or mixtures of water-soluble surfactants and oil-soluble surfactants that have greater water solubility than oil solubility. In fact, the slow release of surfactants or mixtures of surfactants from their solid or gel form, especially at low temperatures, for example when ice is present in the water, is advantageous for controlling the release of the surfactants.

The spreading of oil on a water surface can be described by:

$S=\gamma_{w/a}-(\gamma_{o/a}+\gamma_{w/o})$, where S is the spreading coefficient, and $\gamma_{w/a}$, $\gamma_{o/a}$, and $\gamma_{w/o}$ are the surface tension of water, the surface tension of oil, and the interfacial tension between oil and water, respectively. Oil spreads spontaneously when S>0. The surface tension, $\gamma_{o/a}$, and the interfacial tension, $\gamma_{w/o}$, values for typical crude oils relative to seawater, are between 20 mN/m and 30 mN/m, and between 15 mN/m and 30 mN/m, respectively. By comparison, the surface tension of seawater, $\gamma_{w/a}$, is about 72 mN/m. The combination of low surface and interfacial tension values of the crude oil, and the high surface tension value for seawater results in a high, positive value for the spreading coefficient: 10<S<30, which results in rapid spreading of crude oil over the water when there is an oil spill. Further, evaporation of light alkanes, combined with preferential accumulation of asphaltenes and resins in the aromatic-rich interface region, promotes formation of tar balls far from the site of the original spill, making matters far worse.

A more detailed analysis of the spreading of a liquid as a thin film on another liquid, may be found in: "Spreading And Retraction Of Spilled Crude Oil On Seawater," by K. Takamura et al., Crude Oil Exploration in the World, ISBN 978-952-51-0379-0, edited by Mohamed Abdel-Aziz Younes, InTech-Open Access, March 2012, http://www.intechopen.com/articles/show/title/spreading-and-retraction-of-spilled-crude-oil-on-sea-water, the entire disclosure and teachings of which are hereby incorporated by reference herein.

Reference will now be made in detail to the present embodiments of the invention, examples of which are illustrated in the accompanying drawings. It will be understood that the FIGURES are for the purpose of describing particular embodiments of the invention and are not intended to limit the invention thereto. Turning first to FIG. 1, a graph of the surface tension of seawater as a function of the concentration of the water-soluble non-ionic surfactant, BIO-SOFT® N91-8 (BIO-SOFT is a registered trademark of Stepan Company, Illinois, USA), used as received, and added to the seawater is shown. The surfactant is characterized as $CH_3(CH_2)_nO(CH_2CH_2O)_yH$, with $n\leq 10$ and $y<10$, and preferably where n=8-10, and the average number of moles of ethoxylation, y=8.3. The surface tension of the synthetic seawater (NaCl, KCl, $CaCl_2.2H_2O$ and $MgCl_2.6H_2O$ of 28.0, 0.935, 1.56, and 11.7 g/L, respectively) having a pH between 6 and 7.0, was measured as a function of BIO-SOFT® concentration using the Wilhelmy plate method as adapted for the Kross K100 Tensiometer. A Krüss DVT-10 drop volume tensiometer was used to measure the interfacial tension between the crude oil and seawater.

Although BIO-SOFT® N91-8 has been used to illustrate embodiments of the present invention, other surfactants may be used. Tween® 20 (Tween is a registered trademark of Croda International PLC), a water-soluble non-ionic surfactant (characterized as Polyoxyethylene (20) sorbitan monolaurate (HLB 16.7; CAS#9005-64-5), where HLB is the Hydrophilic-lipophilic balance; and Tween 80: Polyoxyethylene (20) sorbitan monooleate (HLB 15; CAS#9005-65-6), has been successfully tested in the laboratory for retracting oil slicks on both 16° C. water and 0° C. water containing ice. A mixture of 50% by weight of Tween® 20 and 50% by weight of Span® 20 (Span is also a registered trademark of Croda International PLC, characterized as Sorbitan monolaurate (HLB 8.6; CAS#1338-39-2) for Span® 20; and Sorbitan monooleate (HLB 4.3; CAS#1338-43-8) for Span® 80), is an example of a mixture of a water-soluble surfactant, and an oil-soluble non-ionic surfactant mixture, and forms a homogeneous viscous liquid at room temperature. The surfactant mixture, however, could not be completely dissolved in room temperature water at ~3,000 ppm. The frozen equal weight mixture of Tween® 20 and Span® 20 has also been successfully tested in the laboratory for retracting oil slicks on 4° C. water. Branched hydrocarbon, non-ionic surfactants, such as the TDA-series, for example NOVEL® TDA-8, are additional choices of a powerful water-soluble surfactant (NOVEL is a registered trademark of Sasol North America Inc.). Novel® TDA-8 is a non-ionic surfactant having branched chains at its oleophilic end, while BIO-SOFT® has linear hydrocarbon chains, and may be used in accordance with the teachings of the present invention.

It should be mentioned that HLB values are used for polyethoxylated surfactants, and have a range from zero (completely lipophilic) to 20 (completely hydrophilic) and are calculated by dividing the weight percent of ethylene oxide chains in the surfactant by 5.

It is believed by the present inventors that an advantageous value for the HLB for the surfactant mixtures is between about 10 and approximately 14. For example 83% by weight of BIO-SOFT® and 17% by weight of Span 20 provides a mixture with an HLB value of ~13, and 67% of Tween 20 and 33% of Span® 20 generates and HLB of ~14.

Experiments in water containing ice by the present inventors on a laboratory scale have shown that Tween 20 (HLB 16.7) and BIO-SOFT N91-8 (HLB 13.9) can be used to retract spilled oil in the solid state, while Span® 20 (HLB 8.6) cannot.

Figure 2:
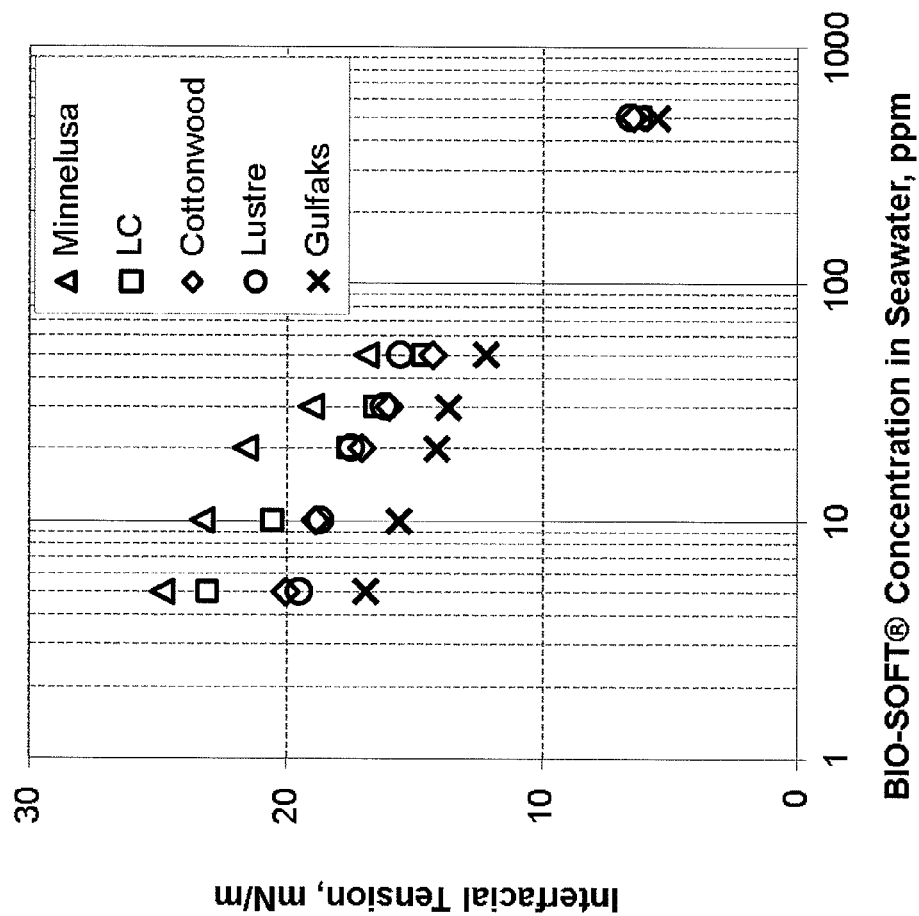
FIG. 2 is a graph of the interfacial tension of several crude oils as a function of the concentration of BIO-SOFT®, a water-soluble non-ionic surfactant added to the seawater.

FIG. 2 represents the measured interfacial tensions for 5 crude oils as a function of the concentration of these surfactants. The $\gamma_{w/o}$ of Minnelusa oil is seen to be reduced by only 8 mN/m, from 27 to 19 mN/m, with the same concentration level of BIO-SOFT® N91-8. The addition of surfactant should decrease the seawater surface tension more than it decreases interfacial tension; therefore, the reduced spreading behavior (quantified as the spreading coefficient) makes the oil slick contract to form oil lenses.

The Equation for S set forth hereinabove, suggests that addition of small amounts of non-ionic surfactant to the water should prevent the spreading of crude oil over the surface of seawater (S<0). The estimated amounts of BIO-SOFT® N91-8, in ppm, to render S=0 are 27, 24, 17, 7, and 5 for Lustre, Gulfaks, Cottonwood, L C, and Minnelusa, respectively, which were confirmed in experiments similar to that described in the EXAMPLE, hereinbelow, and illustrated in FIGS. 3A-3E, hereof. Diffusion of the surfactant away from the surface clearly reduces the surface concentration, whereas a few weeks to a month are required to degrade the surfactant. As will be discussed hereinbelow, a chosen level of surfactant is maintained in the region of the boom by slowly releasing the surfactant in this region.

Containers filled with at least one surfactant may be placed at selected locations along the inner surface of the boom, and in contact with the water. Such containers may include floating containers tethered to the boom. Small quantities of surfactant are continuously discharged into the water to maintain a chosen surface concentration thereof. As stated hereinabove, low concentrations, about 20 ppm to approximately 50 ppm of surfactants are required to cause the oil to move away from the control boom, keeping the boom free of oil and causing the oil to gather within the confines of the boom. Liquid surfactants may be mixed with solid materials such as kaolin and/or talc clay minerals to reduce the rate of dispersion into the seawater. Wave action will slowly release the surfactant and talc together to the surface of the open water. Such clay minerals, not only reduce the dissolution rate of the surfactants, but also become part of the surfactant monolayer for reducing the spread of the oil slick by improving the mechanical properties of the layer, whereby the efficiency and durability of the layer may be significantly improved.

Release of the surfactants may also be controlled by placing a selected number of holes in the containers, or by using a trap door mechanism, the opening and closing of which may be automatic or remotely controlled. Many variations are clearly possible. A porous pipe on the inner side of boom may be used, as may floating time-release capsules tethered to the inside of the boom. Slow release of surfactant material to maintain parts-per-million concentrations of surfactant at or near the oil boom to prevent, or at least minimize contact of the oil boom with oil is advantageous.

Release of the surfactants in conditions where ice is present and typical surfactants are solid or in the form of a gel may also be controlled by preparing mixture of surfactant and inert materials.

Deployment of surfactant can also be accomplished using a floating boundary, such as polyethylene- or polypropylene-based rope (rather than spill control booms), adapted for slowly dispensing the surfactants. Surfactant may be embedded in the porous spaces of the rope by vacuum deposition, as an example. The deployment and recovery of surfactant-laden rope can be in the form of drums rolled with said rope. All of surfactants considered have high viscosities (between about 70 and about 100 cP for BIO-SOFT and NOVEL® TDA-8; ~400 cP for Tween®; and >1000 cP for Span® even at room temperature). Viscosity increases at lower temperatures, and the viscosities of Span®, BIO-SOFT® and Novel® TDA-8 are below their pour points at 0° C., these materials being semi-solid at this temperature. Thus, an organic co-solvent has been used for Span® to maintain liquidity for easy application. Additionally, the deployment of surfactant-laden rope without the use of spill control boom can be advantageous in the water having ice present, where the rope can be deployed in-between the ice blocks. Moreover, the length of the rope can be selectively cut to any length as necessary to accommodate the spill size and prevailing conditions and, it is anticipated that the rope may be delivered by a drone, an airplane, or a small boat, as examples, since handling and deploying lightweight rope is much easier then deploying 2 lbs/ft of boom supplied in 50 or 100 ft. lengths.

Embedding surfactant in the porous spaces of such rope is advantageous for supplying limited surfactant for an effective and rapid first response.

For applications in warmer water, solutions having chosen concentrations below the critical micelle concentration, for example, about 500 ppm, depending on the surfactant or surfactant mixture, may also either be manually or automatically sprayed on the water using a spraying system mounted on the boom or spill response boat in case of application without spill control boom. Drones or other aircraft may also be utilized for such spraying procedures. A soaker hose or porous pipe may also be used to deliver the surfactant solutions with or without the use of oil spill control booms.

There is little benefit to having the effective concentrations above the critical micelle concentration since there is no further reduction in surface tension above this value because the surfactant forms micelles in the water, as seen in FIG. 1 hereof. The solvent for both BIO-SOFT® and Tween® is water, while Span® requires a co-solvent to form an aqueous solution.

In situations where the oil slick is near the shore, or where there are a number of surfactant dispensing craft available, slick contraction may be achieved by deployment of surfactant in the vicinity of only a portion of the oil slick, with or without the presence of floating oil control booms. A chosen length of floating oil control boom might also be employed without forming a closed area around the oil slick.

Having generally described the present invention, the following EXAMPLE is set forth to provide additional details.

EXAMPLE

Figure 3A:
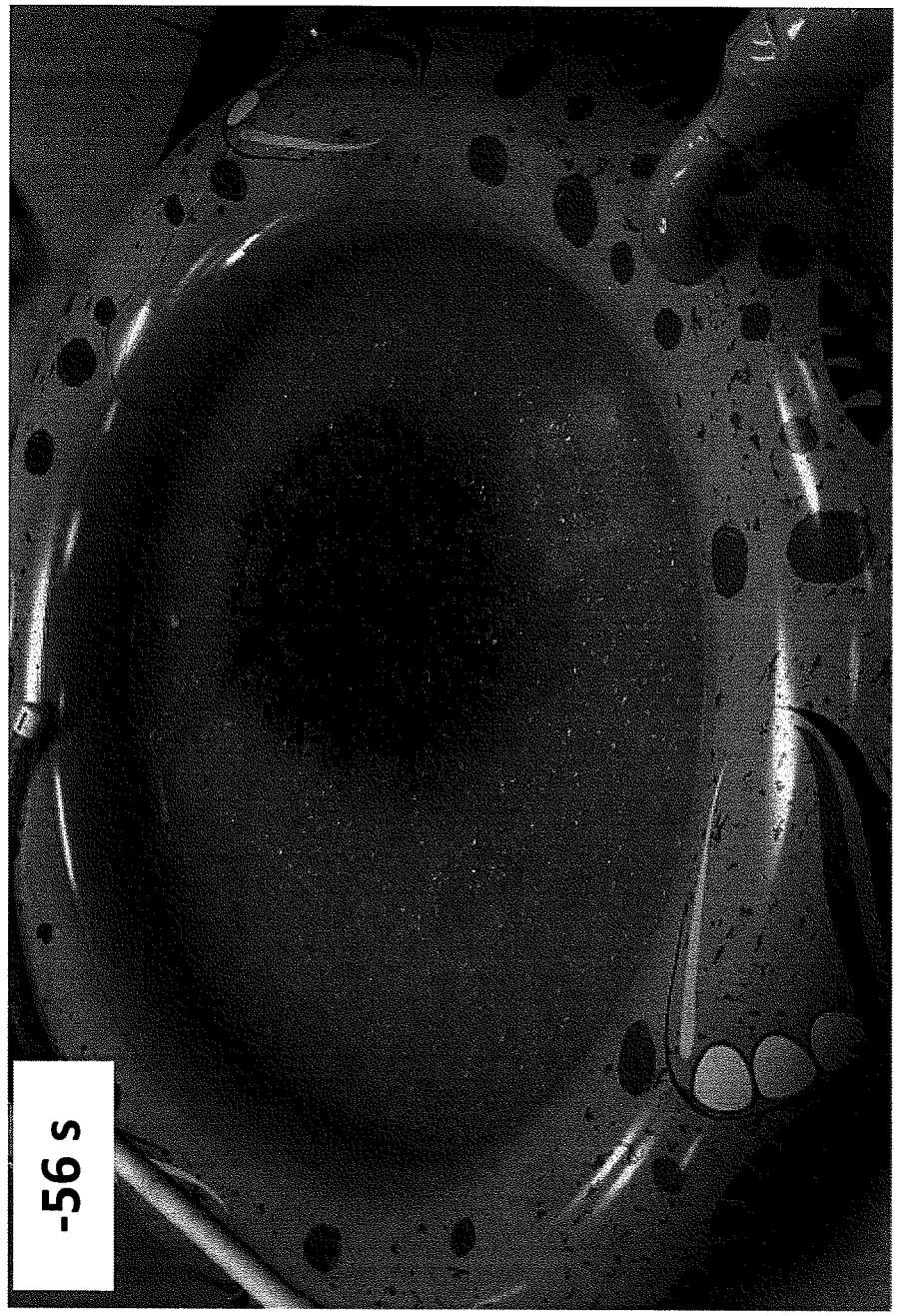
FIGS. 3A-3E illustrate the effect of adding a small quantity of frozen, water-soluble surfactant close to the inner the wall of a small water pool containing tap water, where
Figure 3B:
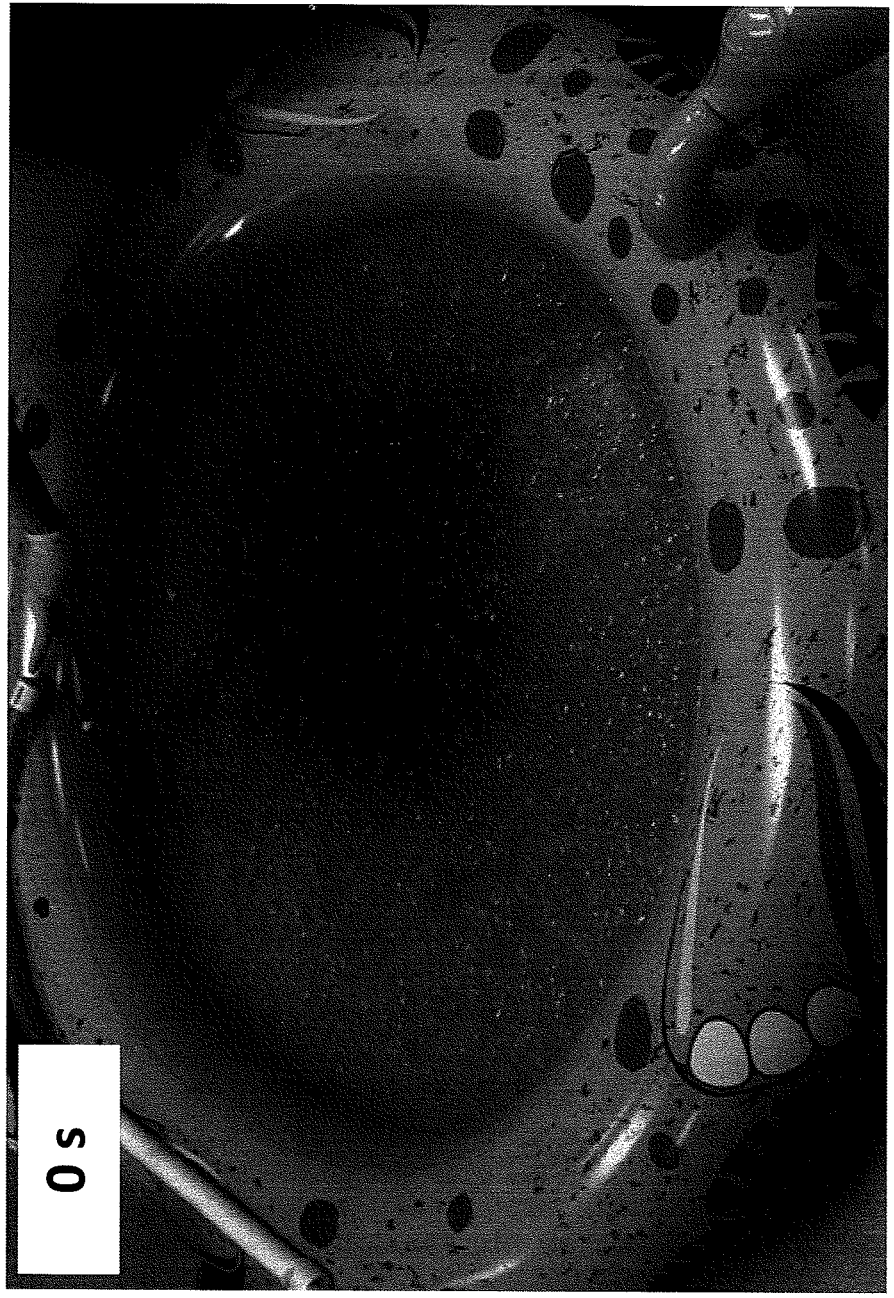
Figure 3C:
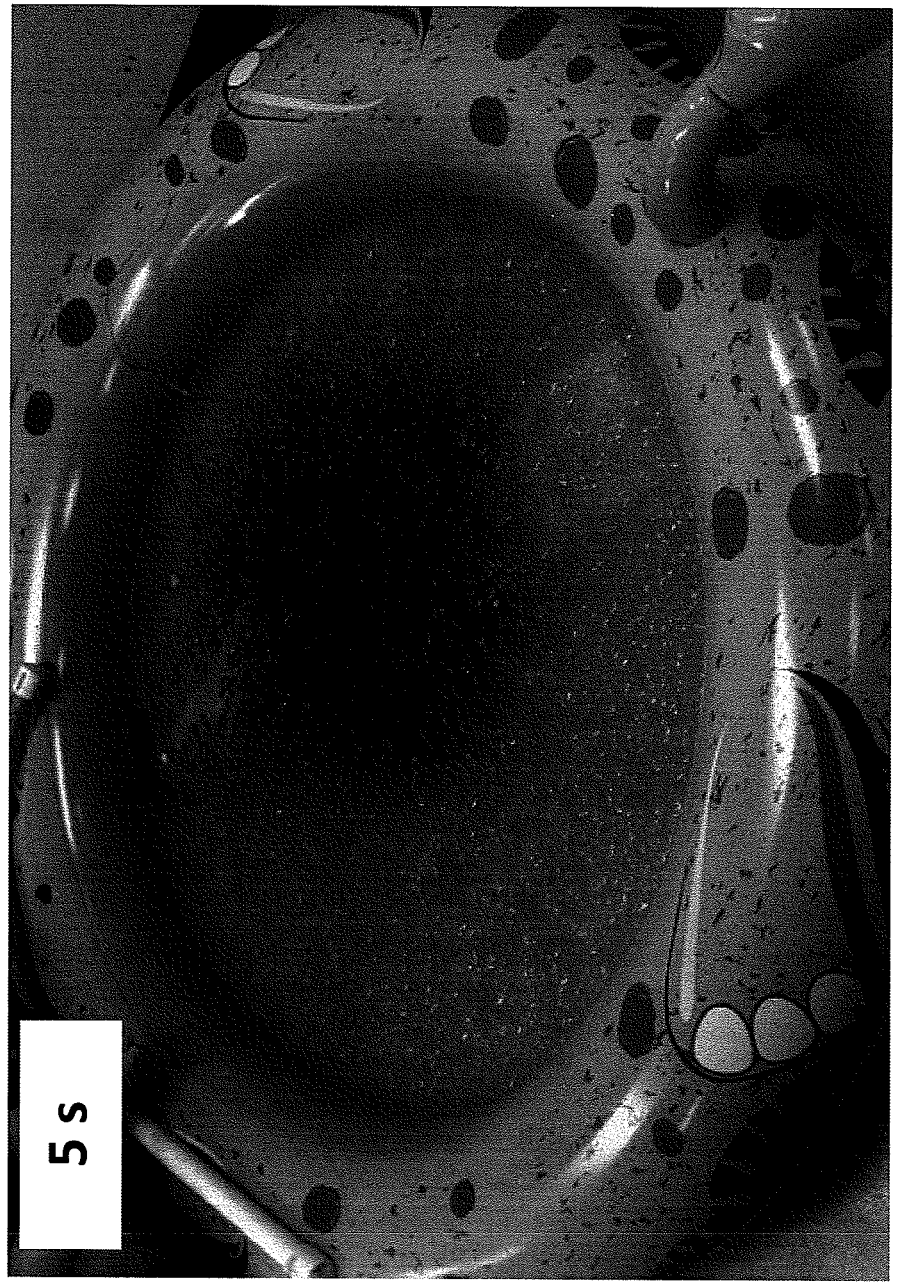
Figure 3D:
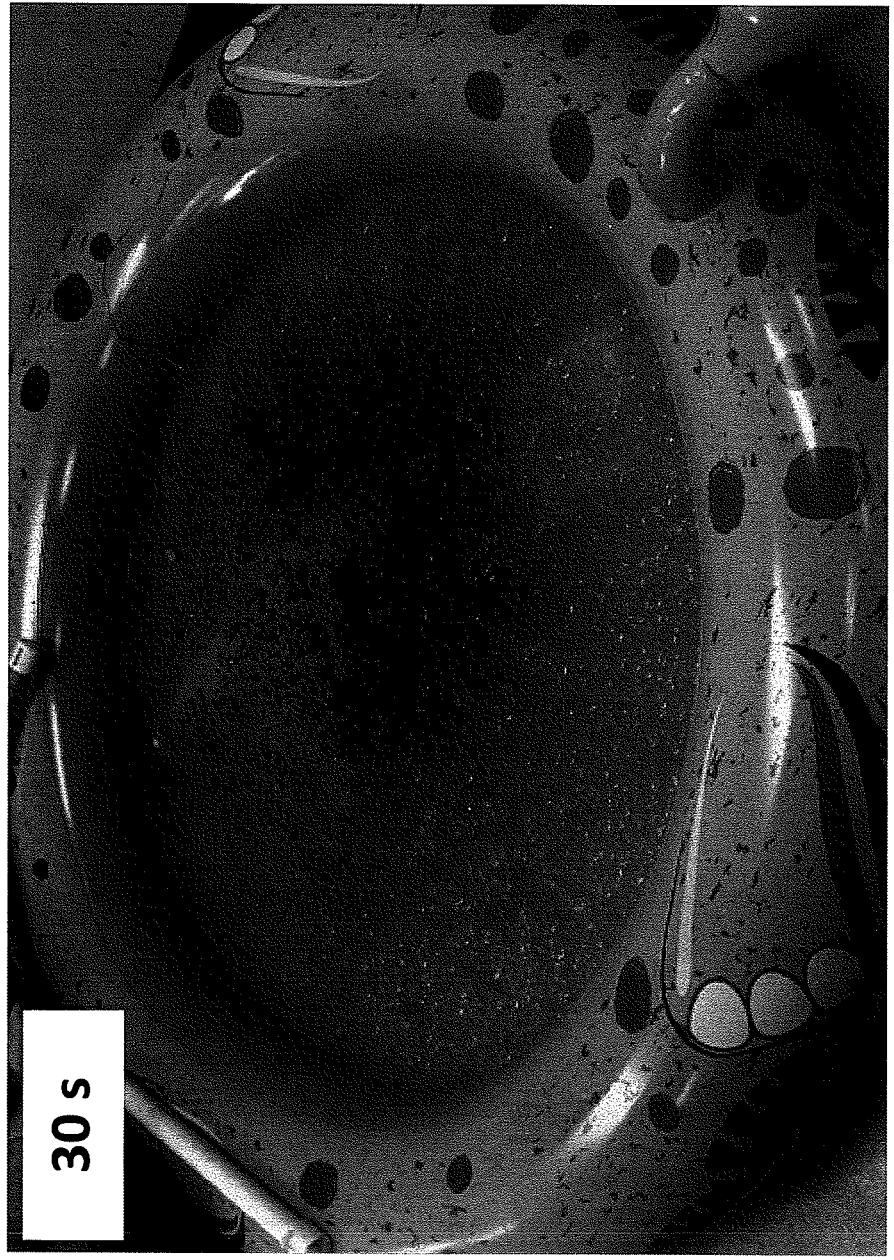
Figure 3E:
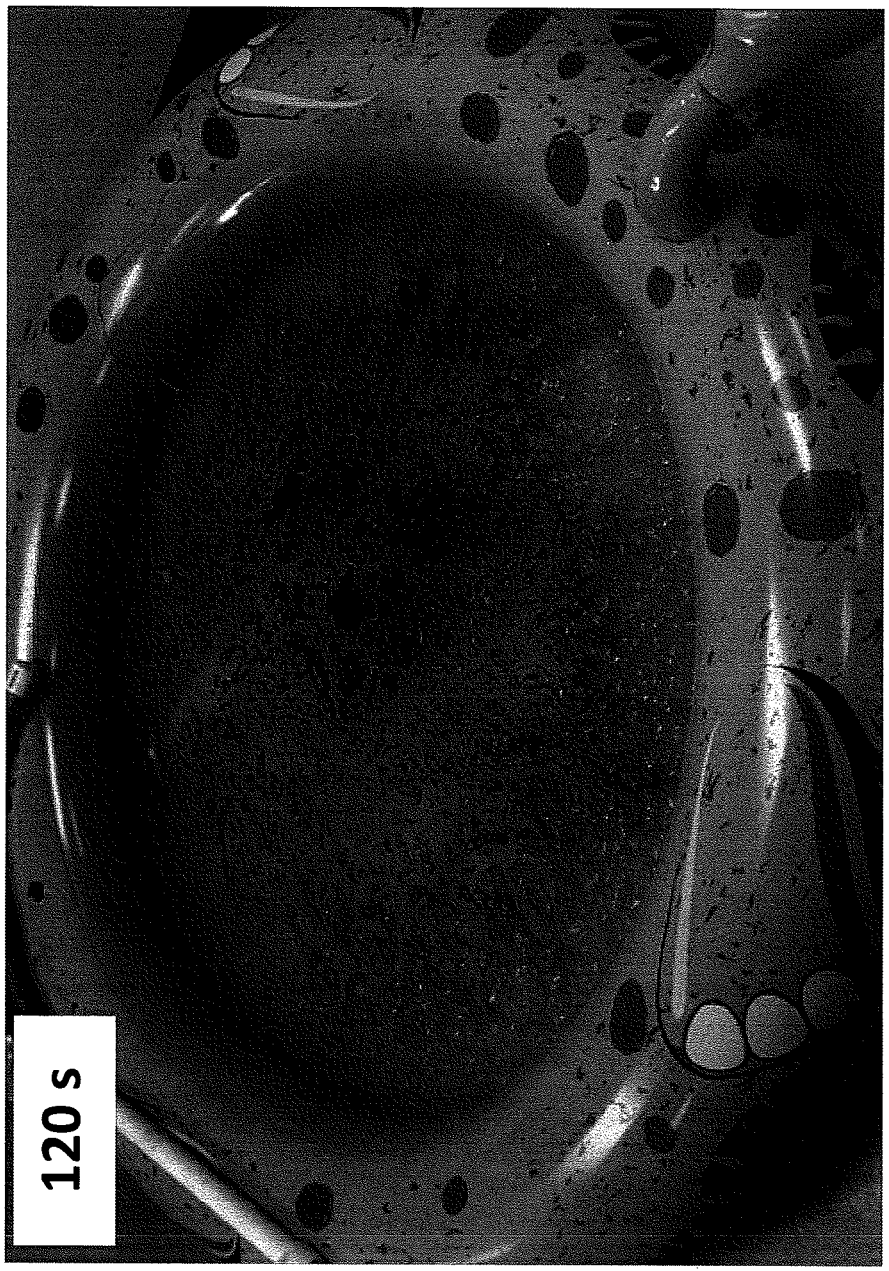

FIGS. 3A-3E illustrates the effect of adding a small piece of a solid form of water-soluble non-ionic surfactant BIO-SOFT® N91-8, prepared by introducing refrigerated liquid water-soluble non-ionic surfactant, near the wall of a small water pool containing ~50 L of ice-infested tap water to which Minnelusa crude oil has been added. The temperature of the ice-infested tap water was measured at about 0° C. The crude oil was observed to spread quickly (S ~17 mN/m) over the water surface; a thin oil film covered the surface of the tap water in the pool within seconds. The following views of the oil retraction as a function of time illustrate that the water surface only needs to be covered with a near mono-layer of the surfactant. Therefore, a slow release of the surfactant will keep the interface concentration above the critical level. The surface tension must drop to at least about 50 mN/m, before oil contraction, or at least a reduction in spreading is observed, which can be achieved by as low as 10 ppm of surfactant in the water, depending on the properties of the oil. FIG. 3A shows Minnelusa crude oil (dark color) poured in a spiral pattern over the surface of water containing ice immediately after it was poured (Ice was added to ~50 L of tap water, and the mixture allowed to sit until the temperature reached ~0° C.), while FIG. 3B shows that oil spreads over the water surface 56 s after the photograph in FIG. 3A was taken. FIG. 3C shows the movement of the oil away from the location of the introduction of solid surfactant (BIO-SOFT® N91-8; the white spot at 11 o'clock) close to the inner wall. As the surfactant on the surface of the water slowly dissolves, the clear surfaces indicate oil contraction from that area after 5 s. Clearly, in a field application, the solid surfactant would be deployed from multiple locations around the oil slick, or from a chosen length of polyethylene rope. FIG. 3D shows additional areas cleared of oil, the oil remaining on the perimeter of the ice as darker spots in the cleared areas), and FIG. 3E illustrates the oil contraction at locations away from the surfactant deployment after 120 s. Such thicker slicks can be mechanically skimmed from the open water surface or burned in-situ. The contraction of the thin oil film was confirmed by using the solid form of water-soluble non-ionic surfactant without the presence of organic co-solvent.

It was also found by the present inventors that frozen Tween® 20 works effectively alone, while frozen Span® 20 did not work by itself, and a mixture of 5% Tween® 20 and 95% Span® 20 gave much better contracting capability than Span® 20 alone. It is known that mixing similar components can produce soluble/compatible mixtures; that is, the ethylene oxide chains found in Span®, Tween®, and BIO-SOFT® interact with water molecules and with each other ethylene oxide units.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for reducing the size of an oil slick, having a spreading coefficient, S, and an area, on a water surface, comprising: deploying a floating oil control boom having a chosen length extending around at least a portion of the area of the oil slick in the vicinity of the oil slick, and a surface facing the oil slick; and dispersing a chosen mixture of at least one water-soluble surfactant and at least one oil-soluble surfactant in the absence of an organic solvent for the at least one oil-soluble surfactant between the floating oil control boom and the oil slick in an amount effective for maintaining the spreading coefficient at a value less than zero.

2. The method of claim 1, further comprising the step of moving the floating oil control boom such that the area of the oil slick is reduced.

3. The method of claim 1, wherein the chosen length of the floating oil control boom is selected such that the floating oil control boom surrounds the oil slick.

4. The method of claim 1, wherein the chosen mixture of at least one water-soluble surfactant and at least one oil-soluble surfactant is introduced between the floating oil boom and the oil slick adjacent to the surface of the floating oil control boom facing the oil slick.

5. The method of claim 4, wherein the chosen mixture of at least one water-soluble surfactant and at least one oil-soluble surfactant is introduced between the floating oil control boom and the oil slick adjacent to the surface of the floating oil control boom facing the oil slick using a soaker hose or a porous pipe.

6. The method of claim 1, further comprising the step of dispersing at least one water-soluble surfactant between the floating oil control boom and the oil slick.

7. The method of claim 6, wherein the at least one water-soluble surfactant is introduced between the floating oil control boom and the oil slick adjacent to the surface of the floating oil control boom facing the oil slick.

8. The method of claim 6, wherein the at least one water-soluble surfactant and the chosen mixture of at least one water-soluble surfactant and at least one oil-soluble surfactant are introduced between the floating oil control boom and the oil slick adjacent to the surface of the floating oil control boom facing the oil slick using a soaker hose or a porous pipe.

9. The method of claim 1, wherein the at least one water-soluble surfactant and the at least one oil-soluble surfactant comprise non-ionic surfactants.

10. The method of claim 1, wherein the at least one water-soluble surfactant is chosen from $CH_3(CH_2)_nO(CH_2CH_2O)_yH$, where $n \leq 10$, and $y<10$, polyoxyethylene (20) sorbitan monolaurate, and polyoxyethylene (20) sorbitan monooleate.

11. The method of claim 10, wherein n is between 8 and 10, and the average value for y=8.3.

12. The method of claim 1, wherein the at least one oil-soluble surfactant is chosen from sorbitan monolaurate, and sorbitan monooleate.

13. The method of claim 1, wherein the chosen mixture of at least one oil-soluble surfactant and at least one water-soluble surfactant has greater water solubility than oil solubility.

14. The method of claim 1, wherein the chosen mixture of at least one oil-soluble surfactant and at least one water-soluble surfactant has an HLB value between about 10 and about 14.

15. A method for reducing the size of an oil slick, having a spreading coefficient, S, and an area, on a water surface, comprising: dispersing a chosen mixture of at least one water-soluble surfactant and at least one oil-soluble surfactant in the absence of an organic solvent for the at least one oil-soluble surfactant at least at one location in the vicinity of the oil slick in an amount effective for maintaining the spreading coefficient at a value less than zero in the absence of a floating oil control boom, wherein the at least one water-soluble surfactant is chosen from $CH_3(CH_2)_nO(CH_2CH_2O)_yH$, where $n \leq 10$, and $y<10$, polyoxyethylene (20) sorbitan monolaurate, and polyoxyethylene (20) sorbitan monooleate.

16. The method of claim 15, wherein n is between 8 and 10, and the average value for y=8.3.

17. The method of claim 15, wherein the at least one oil-soluble surfactant is chosen from sorbitan monolaurate, and sorbitan monooleate.

18. A method for reducing the size of an oil slick, having a spreading coefficient, S, and an area, on a water surface, comprising: deploying a floating rope having a chosen length extending around at least a portion of the area of the oil slick in the vicinity of the oil slick impregnated with at least one water-soluble surfactant or a chosen mixture of at least one water-soluble surfactant and at least one oil-soluble surfactant in the absence of an organic solvent for the at least one oil-soluble surfactant for releasing the at least one water-soluble surfactant or the chosen mixture of at least one water-soluble surfactant and at least one oil-soluble surfactant in an amount effective for maintaining the spreading coefficient at a value less than zero.

19. The method of claim 18, wherein the floating rope is chosen from polyethylene-based rope and polypropylene-based rope and mixtures thereof.

20. The method of claim 18, further comprising the step of moving the floating rope such that the area of the oil slick is reduced.

21. The method of claim 18, wherein the chosen length of the floating rope is selected such that the rope surrounds the oil slick.

22. The method of claim 18, wherein the at least one water-soluble surfactant and the at least one oil-soluble surfactant comprise non-ionic surfactants.

23. The method of claim 18, wherein the at least one water-soluble surfactant is chosen from $CH_3(CH_2)_nO(CH_2CH_2O)_yH$, where $n \leq 10$, and $y<10$, polyoxyethylene (20) sorbitan monolaurate, and; polyoxyethylene (20) sorbitan monooleate.

24. The method of claim 23, wherein n is between 8 and 10, and the average value for y=8.3.

25. The method of claim 18, wherein the at least one oil-soluble surfactant is chosen from sorbitan monolaurate, and sorbitan monooleate.

26. The method of claim 18, wherein the chosen mixture of at least one oil-soluble surfactant and at least one water-soluble surfactant has greater water solubility than oil solubility.

27. The method of claim 18, wherein the chosen mixture of at least one oil-soluble surfactant and at least one water-soluble surfactant has an HLB value between about 10 and about 14.

* * * * *